United States Patent [19]

Yang

[11] Patent Number: 6,049,636
[45] Date of Patent: *Apr. 11, 2000

[54] DETERMINING A RECTANGULAR BOX ENCOMPASSING A DIGITAL PICTURE WITHIN A DIGITAL IMAGE

[75] Inventor: Xiaoli Yang, Bellevue, Wash.

[73] Assignee: Microsoft Corporation, Redmond, Wash.

[*] Notice: This patent issued on a continued prosecution application filed under 37 CFR 1.53(d), and is subject to the twenty year patent term provisions of 35 U.S.C. 154(a)(2).

[21] Appl. No.: 08/885,298

[22] Filed: Jun. 27, 1997

[51] Int. Cl.$^7$ ....................................................... G06K 9/36
[52] U.S. Cl. .......................... 382/289; 382/282; 382/291; 382/293; 345/440; 345/441; 345/443
[58] Field of Search ..................................... 382/289, 282, 382/283, 291, 177, 176, 286, 170, 293; 345/424, 438, 440, 441, 443

[56] References Cited

U.S. PATENT DOCUMENTS

| | | | |
|---|---|---|---|
| 5,056,045 | 10/1991 | Ohsawa | 364/522 |
| 5,063,604 | 11/1991 | Weiman | 382/41 |
| 5,257,097 | 10/1993 | Pineau et al. | 358/500 |
| 5,448,688 | 9/1995 | Hemingway | 395/141 |
| 5,583,949 | 12/1996 | Smith et al. | 382/199 |
| 5,764,814 | 6/1998 | Chen et al. | 382/243 |

OTHER PUBLICATIONS

VistaScan Scanner Interface Software User's Guide, UMAX Data Systems, Inc., 1994.

Ofoto Version 2 User Manual, Light Source Computer Images, Inc., Second Edition, Nov. 1993, pp. 1–7.

HP DeskScan II Microsoft Windows Version User's Guide, Hewlett Packard, Sep., 1995, pp. 4–57 to 4–64, 5–4 to 5–5.

Ballard, D. and Brown, C., Computer Vision, 1980, Chapters 3–4, pp 63–148.

Lee, David, "Edge Detection, Classification and Management", *Proceedings of Computer Vision and Pattern Recognition of IEEE Computer Society Conference, 1989*, 1989, pp 2–10.

Kundu, Amlan, "Robust Edge Detection", *Proceedings of Computer Vision and Pattern Recognition of IEEE Computer Society Conference, 1989*, 1989, pp 2–10.

*Primary Examiner*—Leo H. Boudreau
*Assistant Examiner*—Kanji Patel
*Attorney, Agent, or Firm*—Leydig, Voit & Mayer, Ltd.

[57] ABSTRACT

An invention for determining a rectangular bounding box encompassing a photograph or object(s) represented within a digital image is disclosed. The rectangular bounding box is determined irrespective of the device used to acquire the digital image. First a set of contrast points is derived; these contrast points representing changes in the characteristics of a pixel from that of a traversed neighbor. After ordering the contrast points according to their radial angle around a central reference point, a list of lines is generated by selecting two points separated by q positions in the ordered list of contrast points. If the four lines generated the most often roughly form a rectangle, then they correspond to the sides of the rectangular bounding box. Else, the line with the highest count is used as a base side of the rectangular bounding box. The slopes of the other sides are readily calculated as they are either perpendicular and parallel to base side, and their positions are then determined with reference to the other lines in the list. Once the rectangular bounding box has been determined, the digital photograph is extracted, or a high-resolution scan is performed and the digital photograph is readily extracted from this new high-resolution image based on the corresponding position and size of the rectangular bounding box.

22 Claims, 7 Drawing Sheets

DETERMINING A RECTANGULAR BOX ENCOMPASSING A DIGITAL PICTURE WITHIN A DIGITAL IMAGE

FIELD OF THE INVENTION

This invention relates to digital image processing, and more particularly, to the automated processing of a digital image to determine a rectangular box encompassing a photograph or object(s) represented therein.

BACKGROUND OF THE INVENTION

Displaying and storing of photographs using a computer is becoming increasingly prevalent because of continuing improvements in hardware devices and increasing user demand. Larger capacity disk storage devices allow numerous images to be stored on a disk. Also, increasingly powerful central processing units (CPUs) allow convenient, rapid retrieval and browsing of these digital photographs. The development of the World-Wide Web has further increased the demand for digital photographs as businesses and individuals are developing their own Web pages which routinely include digital photographs.

Even though cameras directly producing a digital photograph are available, converting a conventional photograph into a digital photograph using a scanner attached to a computer remains a very common process. To accomplish this conversion, a photograph is first placed on the surface of a scanner. The size of this surface is typically several times the size of the photograph. The scanner is then activated to "scan" or digitize an image of its scanning surface. The digital image created by the scanner is usually in the form of a matrix or an array of picture elements ("pixels"); the matrix or array being proportionally sized to the size of the surface of the scanner. From this digital image, the "digital photograph" or portion representing the original photograph or object(s) must be extracted.

A first method for creating the desired digital photograph from this image is to use a digital image editor or drawing package. However, to achieve the desired digital photograph, the user must manually perform numerous, complex and tedious manipulation operations to edit the image on a pixel by pixel basis.

Overcoming some of the disadvantages of the first method, another common technique to extract the digital photograph begins with displaying the digital image on a computer monitor. The user then uses a pointing device (e.g., a mouse) to indicate a rectangular box encompassing the digital photograph, where the sides of the rectangular box are parallel to sides of the digital image. A crop function then extracts digital photograph from the larger digital image created from the scan. This process is very time consuming and requires complex user operations.

Both of these techniques require complex user interactions that are disadvantageous to the general acceptance of these scanning techniques by non-professional users. For example, in order for the digital photograph to contain an image of the actual photograph without extraneous information, either the photograph must be perfectly aligned on the scanner surface such that the sides of the photograph are parallel to that of the scanner surface, or complex editing of the digital image must be manually performed by the user as described above. A user might need to adjust and re-scan a photograph several time before proper alignment is achieved. And after these iterations, the user still will need to crop the image.

The overall time required for this extraction process can be decreased using a pre-scan step in which the scanner first performs a low-resolution (instead of a high-resolution) scan of the entire scanner surface. Like in the process described above, the user indicates via a pointing device a rectangular box encompassing the digital photograph. Then, an area of the scanner surface corresponding to that of the rectangular box is scanned at a higher resolution to acquire a high-resolution digital image. The corresponding portion of the high-resolution digital image within the rectangular box is extracted to form the desired digital photograph. This technique is faster than the previously described technique and requires less computer system memory because only a section of the scanner surface proportional to the size of the photograph is scanned at the higher resolution.

A known software system uses UMAX VistaScan Scanner Interface Software running under Adobe PhotoShop on a Macintosh computer for controlling a UMAX Vista scanner. This software has an "AutoScan Operation" which performs the following steps in the listed order: image preview, crop, deskew, scan mode detection, image quality adjustments, applying the scale factor, final scan, and applying "magic match". However, this software is hardware specific, requiring a UMAX scanner for proper operation which severely limits the acceptance of this techniques in the non-commercial consumer market.

There is a need for a digital image processing system in which the scanning and digital photograph extraction techniques described above and others can be automatically performed more easily, rapidly and accurately across all scanner peripherals.

SUMMARY OF THE INVENTION

According to the invention, a rectangular bounding box encompassing a digital representation of a photograph or object(s) is automatically determined within a digital image. Using this rectangular bounding box to define an image area, the digital representation of the photograph or object(s) is then extracted from the original digital image or a higher resolution digital image to create a digital photograph. For a digital image produced using a scanner, the digital photograph is extracted regardless of the scanner hardware employed. With the digital photograph framed and referenced to the rectangular bounding box, the digital photograph can be re-oriented so that the digital photograph is registered to the user's video screen for reproduction or editing. Preferably, the registration automatically orients the sides of the rectangular bounding box to be parallel with the sides of the video screen; and in doing so, reorients the digital photograph bounded by the rectangular bounding box. Also, by knowing the area of the scanning surface of interest, the characteristics of the scanner can be adjusted to achieve a better quality scan of the area encompassed by the rectangular bounding box.

More specifically, after a digital image is acquired via a scanner or some other device or process, picture elements ("pixels") are identified that likely lay at the perimeter of an area encompassing the photograph or object(s) represented therein. An identified pixel or "contrast point" is defined as a pixel that is significantly different than an adjacent, immediately previously traversed pixel. In other words, a contrast point is a pixel where there is a sharp change in the value of a pixel from the normal background.

When the digital image is acquired via a scanner, noise anomalies present in a digital image produced by a typical flatbed scanner must be overcome to accurately determine the rectangular bounding box. A normal flat bed scanner has an even background, such that digital image produced using a scanner to scan an object typically has an even color and intensity level for the background areas, i.e., those areas not corresponding to the original photograph being scanned. However, because of the hardware lighting and dust on the scanning surface, sparse noise is randomly introduced into digital image produced from the output of the scanner. Therefore, because a scanner produces a digital image containing sparse noise at random locations, only a portion of the contrast points identified correspond to locations on the perimeter of the digital photograph to be extracted from the digital image.

After the contrast points in the digital image have been identified, a set of lines is created using selected pairs of the contrast points; whereby each of these lines potentially coincides with a portion of the perimeter of the desired digital photograph. The number of occurrences of each line is determined, where two lines are considered the same if their slope and position are each within some respective small delta of the other's slope and position.

From this set of lines, the four lines occurring the most frequently are selected, as these lines have the greatest probability of corresponding to the four sides of the rectangular bounding box for producing the desired digital photograph. Each of these four lines is compared with the list of lines, and their respective slope and position are possibly adjusted slightly so more contrast points lie on each line. If these four lines intersect to approximately form a rectangle, then the sides of the rectangular bounding box are determined from these four lines. However, if these four lines do not approximately form a rectangle, a first side of the rectangular bounding box is determined which coincides with the line that was produced most from the set of contrast points. Using the simple and well known geometric relationships between the sides of a rectangle, each of the three other sides is either perpendicular or parallel to this first side. While the orientation of these three other sides is dependent upon the geometry of a rectangle, their location (e.g., points of their intersection with the first line or parallel distance from it) is determined by referencing the set of lines to produce a rectangular bounding box whose edges best coincide or encompass the digital representation of original photograph or object(s).

After the positions of all of the sides of the rectangular bounding box have been determined, the list of contrast points is once again referenced to determine whether a threshold percentage of the contrast points lie within the rectangular bounding box. If this threshold has not been achieved, then the sides of the rectangular bounding box are shifted to include more contrast points until such a threshold percentage of contrast points lies within the rectangular bounding box.

Having determined the rectangular bounding box, the digital photograph can be directly extracted from the original digital image. Alternatively, a higher-resolution scan is performed on a portion of the scanning surface whose location corresponds to that of the rectangular bounding box to produce a higher-resolution digital image which includes a digital representation of the original photograph or object (s). From this new digital image, the digital photograph is extracted by proportionally adjusting the size and location of the previously determined rectangular bounding box to account for the difference in resolution of the two digital images.

Additional features and advantages of the invention will be made apparent from the following detailed description of an illustrated embodiment which proceeds with reference to the accompanying drawings.

BRIEF DESCRIPTION OF THE DRAWINGS

The appended claims set forth the features of the present invention with particularity. The invention, together with its advantages, may be best understood from the following detailed description taken in conjunction with the accompanying drawings of which:

DETAILED DESCRIPTION OF THE PREFERRED EMBODIMENT

Figure 1:
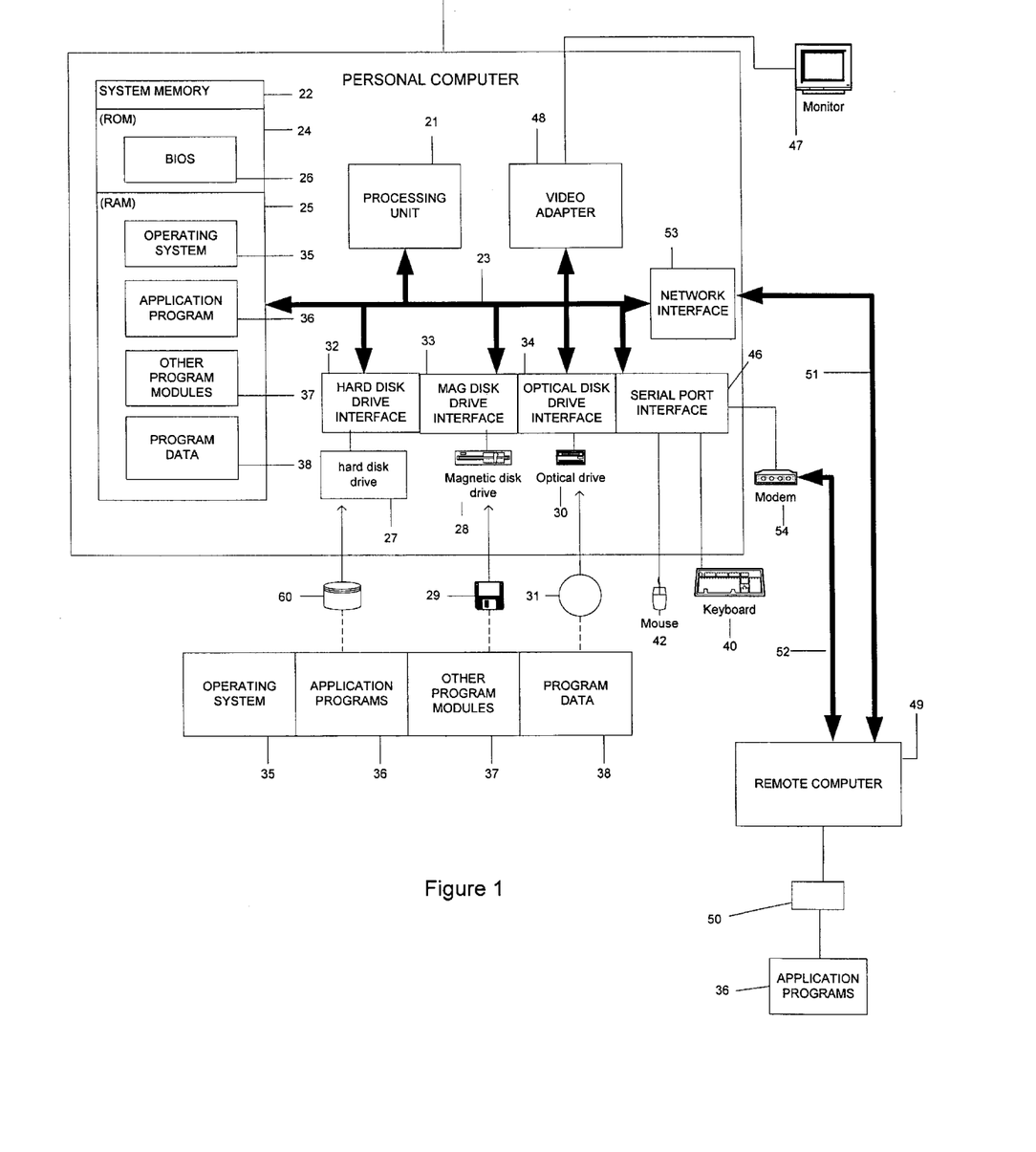
FIG. 1 is a block diagram of an exemplary operating environment in which the invention may be implemented, including a computer system for inputting a digital image using a scanner, determining a rectangular bounding box, and extracting a digital photograph in accordance with the invention.

FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS) containing the basic routines that helps to transfer information between elements within the personal computer 20, such as during start-up, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be collected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices (not shown), such as speakers and printers. Also, personal computers typically include a scanner interface 60 and scanner 62 and other peripheral input devices (not shown).

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Figure 2:
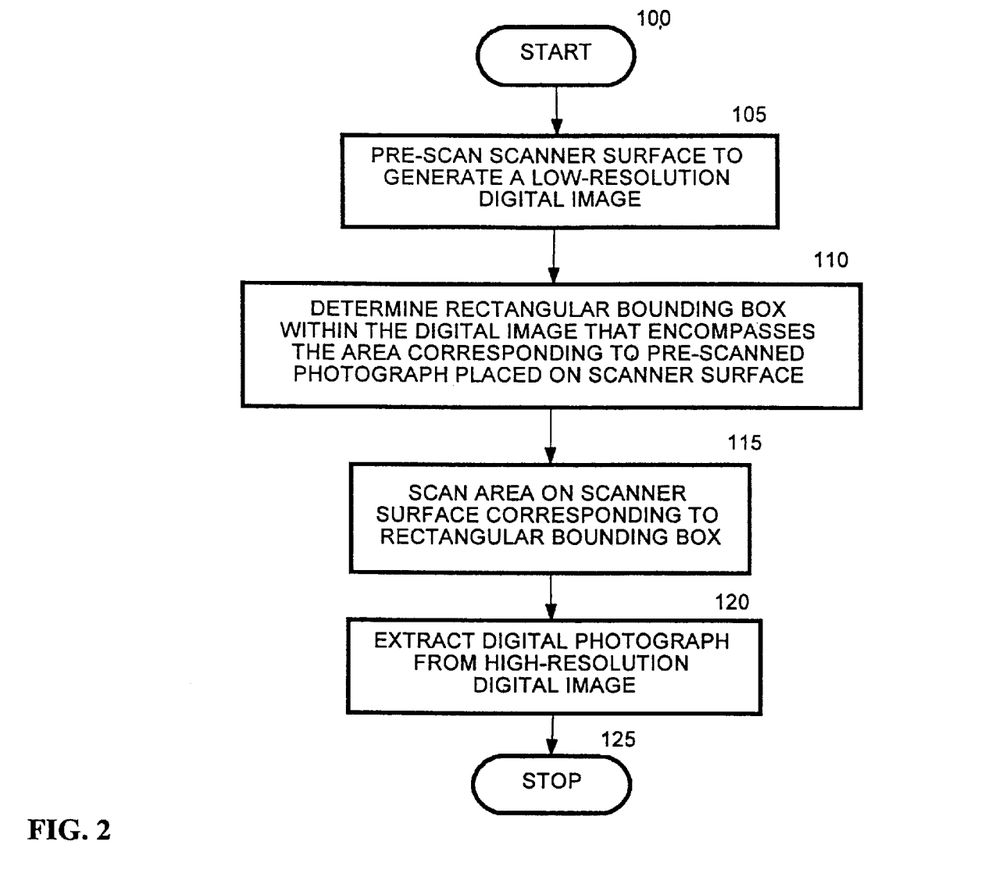
FIG. 2 is a high-level flow diagram describing the steps for automatically converting a photograph placed on a scanner into a digital photograph.
Figure 3:
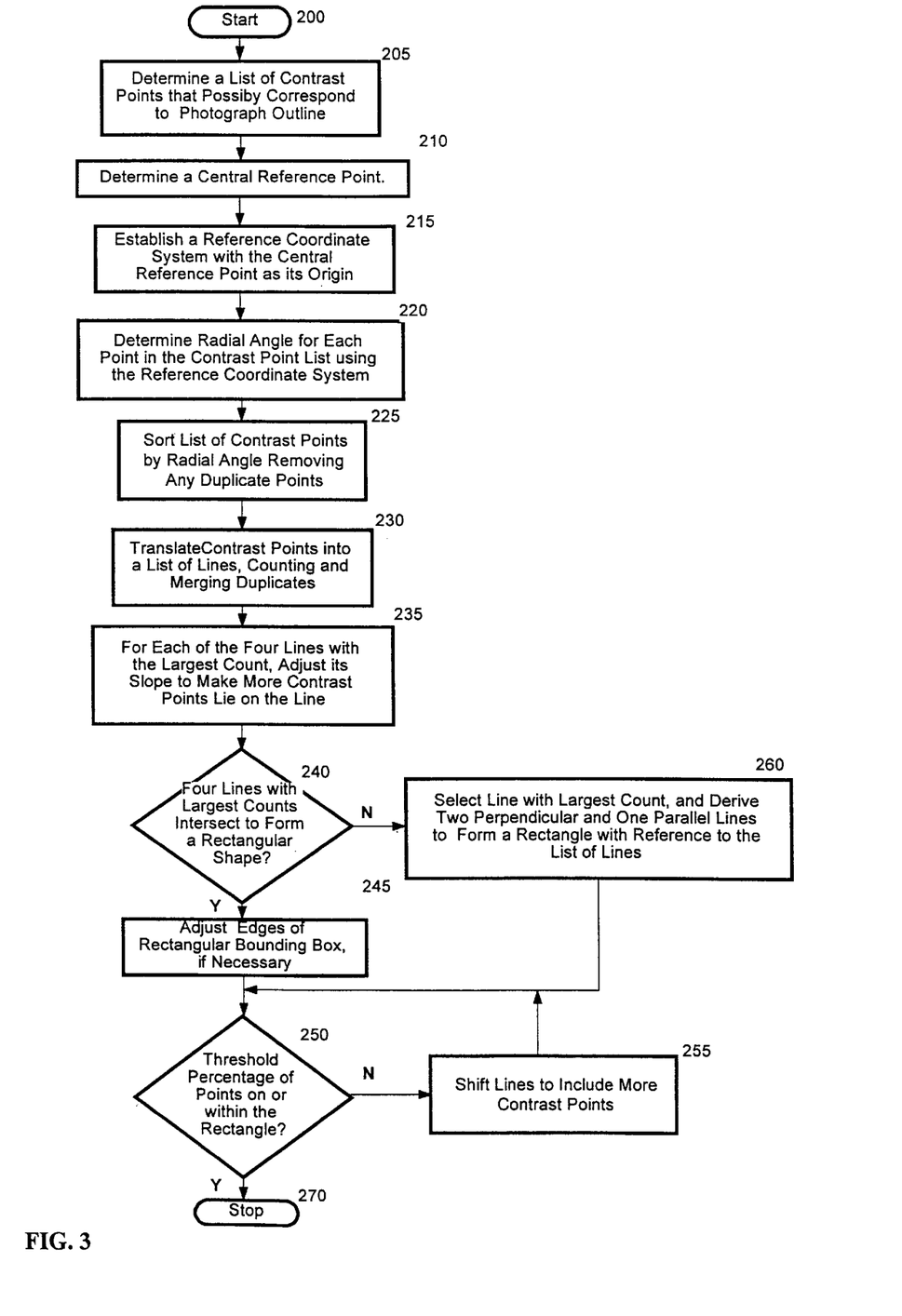
FIG. 3 is a detailed flow diagram specifying the steps of an embodiment of the invention for determining the rectangular bounding box.
Figure 5A:
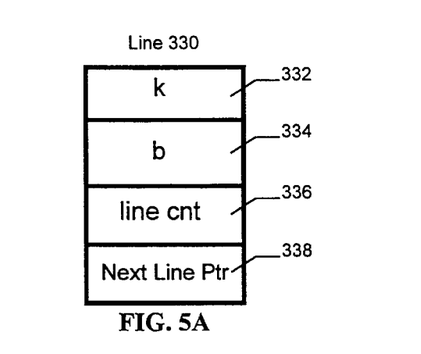
FIG. 5A is a schematic diagram of the data structure for a line.
Figure 5B:
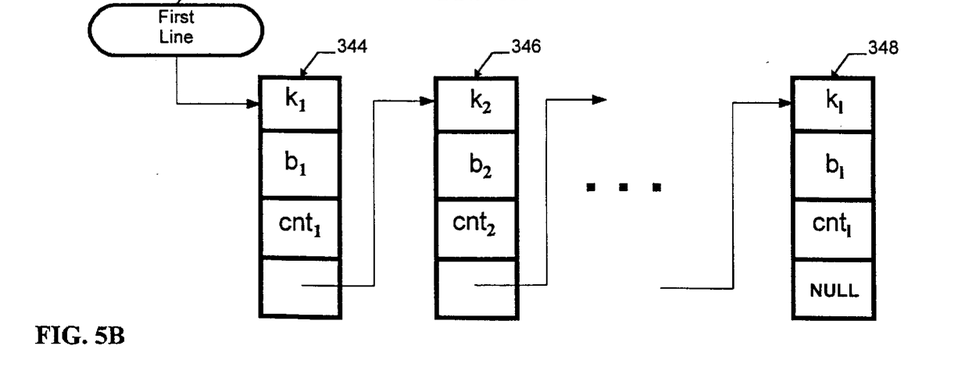
FIG. 5B is a schematic diagram of the data structure for the list of lines linking together multiple line data structures depicted in FIG. 5A.
Figure 6A:
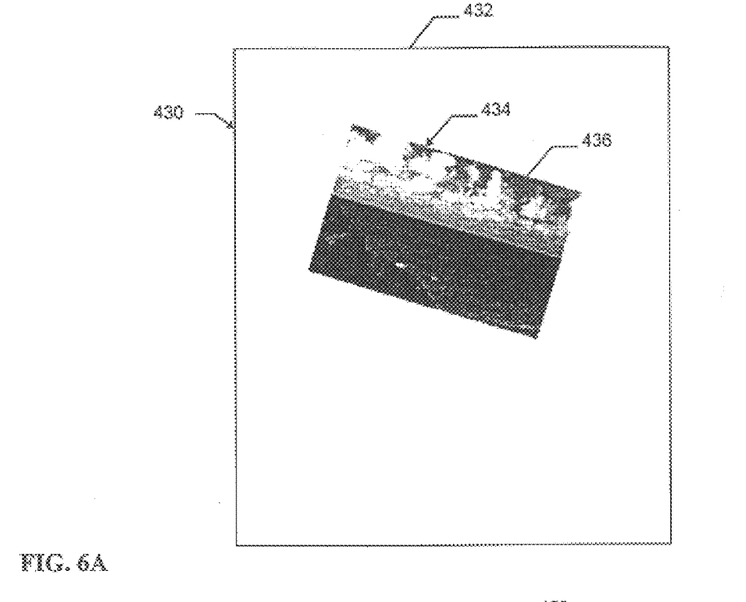
FIG. 6A is a schematic diagram illustrating a orientation and placement of an exemplary photograph on the surface of a scanner.
Figure 6B:
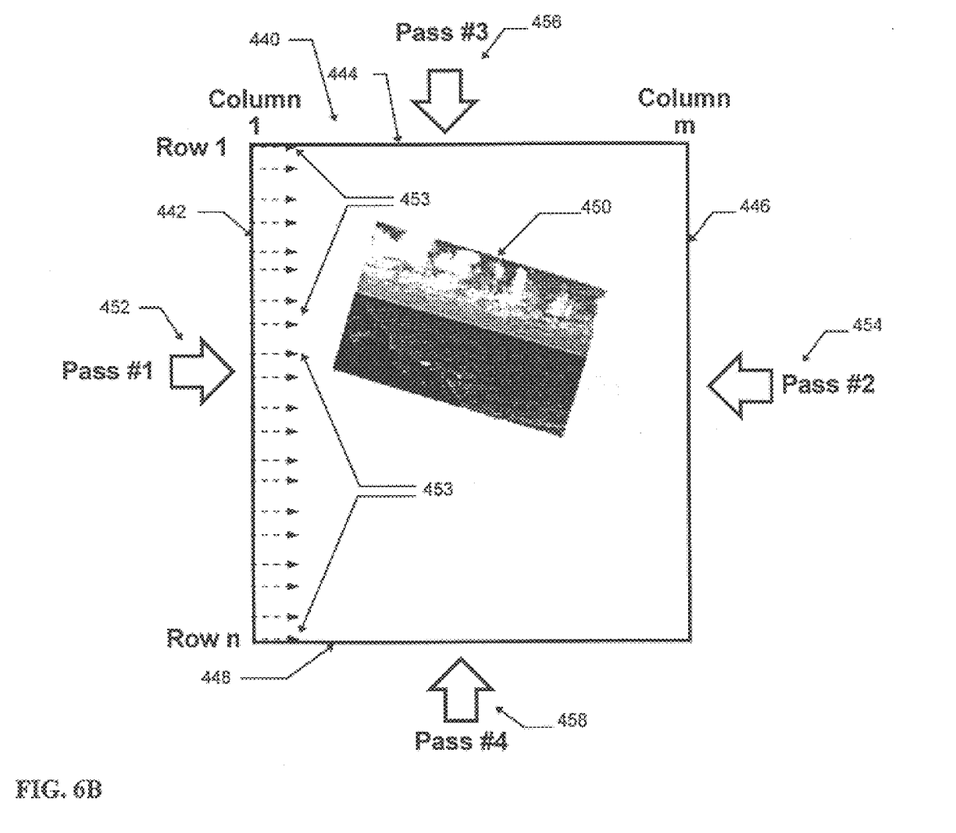
FIG. 6B is a schematic diagram illustrating the steps for determining the list of contrast points corresponding to the sides of the photograph placed on the scanner surface as illustrated in FIG. 6A.
Figure 6C:
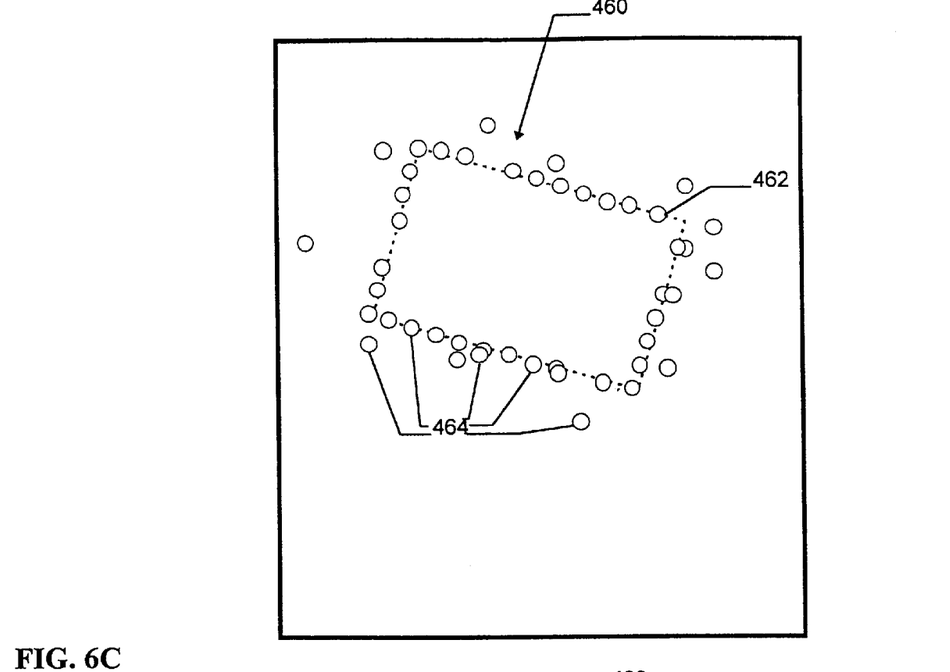
FIG. 6C is as schematic diagram illustrating a potential set of contrast points determined in accordance with the invention for the photograph placed on the scanner as shown in FIG. 6A.
Figure 6D:
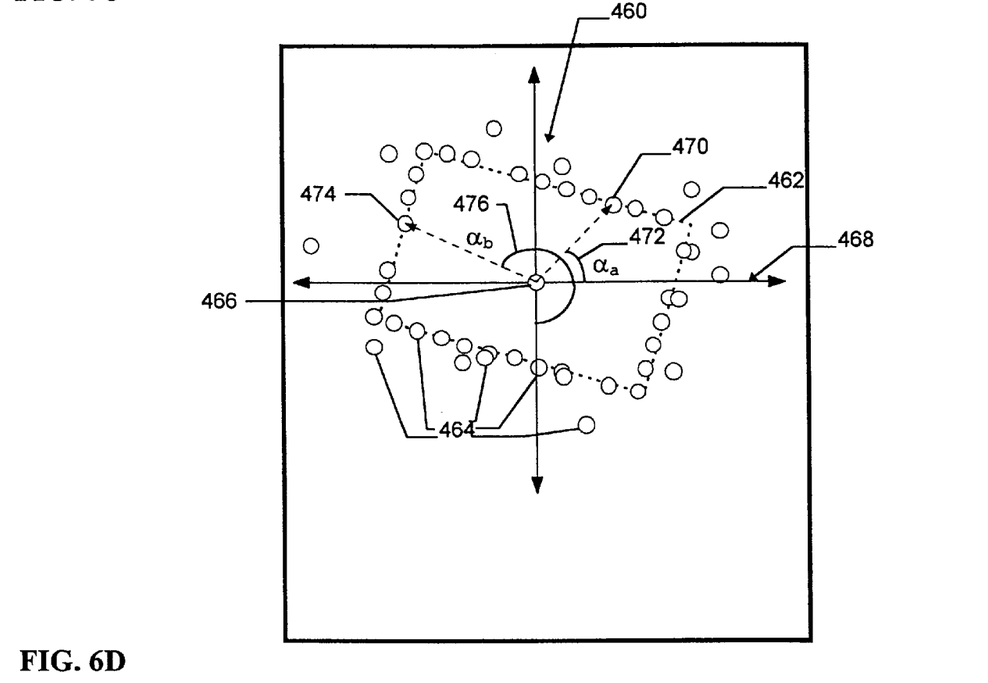
FIG. 6D is a schematic diagram showing the placement of a referenced point and reference coordinate system for the set of contrast points shown in FIG. 6C.
Figure 6E:
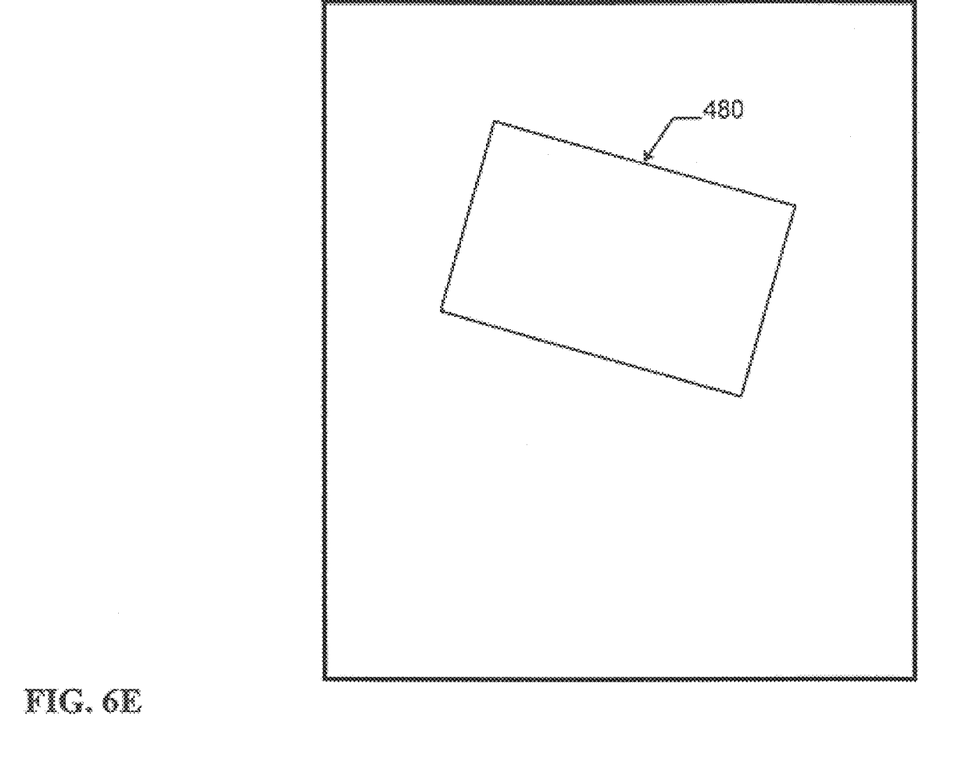
FIG. 6E is a schematic diagram illustrating the rectangular bounding box determined in accordance with the invention for the photograph placed on the scanner as shown in FIG. 6A.
Figure 6F:
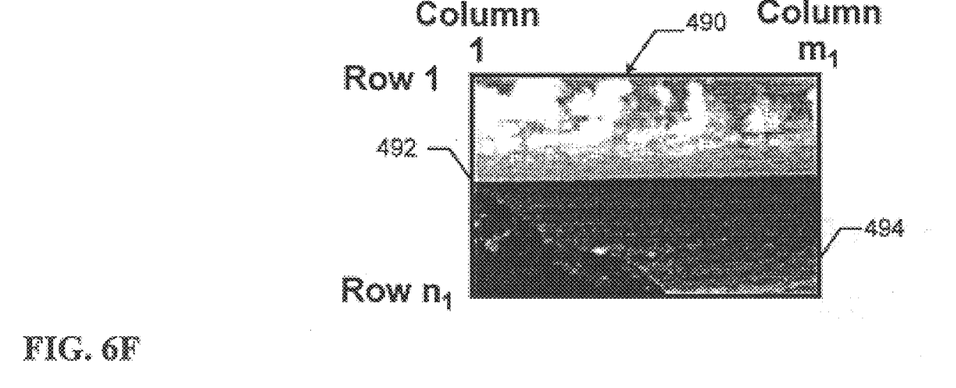
FIG. 6F is a schematic diagram illustrating the resultant digital photograph derived using the rectangular bounding box shown in FIG. 6E and extracted from the digital image shown in FIG. 6B.

Turning now to FIG. 2 with reference to FIGS. 6A and 6F, shown is a high-level flow diagram illustrating the steps performed to determine and produce a digital photograph 490 from a photograph 434 placed on the surface 430 of scanner 62 in an embodiment in accordance with the invention. The high-level steps contained within this flow diagram will be described with reference to other figures: FIG. 3 provides a detailed flow diagram of step 110, and schematic FIGS. 4, 5, and 6A–F visually illustrate the performance of the steps according to the flow diagrams.

In the first step 105 of the embodiment disclosed in FIG. 2, a pre-scan operation is performed to generate a low-resolution digital image 440 of the surface 430 of the scanner 62, including an original photograph 434. The invention automatically detects the rectangular bounding box for a photograph placed on the scanner surface 430 in any location and in a skewed orientation. As illustrated by FIG. 6A, side 436 of photograph 434 is not parallel to side 432 of the scanner surface 430, nor is any portion of side 436 coextensive with side 32. The pre-scan operation of step 105 is initiated by processing unit 21 of the computer system 1 shown in FIG. 1. Scanner 62 then performs a low-resolution scan of its surface 430, causing digital image 440 to be generated and transferred into system memory 22 via system bus 23. As will be apparent to one skilled in the art relevant to this invention, a high-resolution scan or some variant could be substituted for the low-resolution pre-scan performed in step 105.

The digital image 440 output by scanner 62 is shown in FIG. 6B and is stored as an n×m matrix or array of pixels, having n rows and m columns of pixels. The dimensions of the matrix is a function of the size of the scanned area of the surface 430 of scanner 62 and the scanning resolution. For a typical black and white scanner, each pixel is represented by an 8-bit byte having a value ranging from 0–255. The exact representation of a pixel is dependent on the scanner and its user settings. A color scanner will commonly represent a pixel with multiple bytes, each corresponding to an RGB or related value.

Returning to the flow diagram of FIG. 2, in the next step 110, the rectangular bounding box 480 is determined which encompasses the area within the digital image 440 corresponding to the position and size of the original photograph 434 placed on the scanner surface 430. A detailed flow diagram of this process is shown in FIG. 3, and will be explained with reference to FIGS. 4A–B and 5A–B which describe the data structures used, and FIGS. 6B–E which visually illustrate the processing of the digital image 440 to generate the rectangular bounding box 480.

Referring to the first step 205 of the detailed flow diagram of FIG. 3, a list 310 of contrast points 300 is determined. These contrast points 300 indicating the perimeter of original photograph 434.

A contrast point in an embodiment according to the invention is defined as a pixel in which there is a relative change in the characteristics of a pixel compared with the prior adjacent pixel last checked. Applicant has empirically determined that a minimum of a twenty percent intensity difference constitutes a sufficient basis to identify a contrast point in a typical scanner environment. The invention further contemplates adjusting this minimum percentage or using another pixel characteristic in order to identify a contrast point from the normal background of its neighboring pixels should the scanning environment or digital image so dictate.

Should a photograph be placed such that there is no background surrounding it (i.e., a side of the photograph coincides or extends beyond an edge of the scanner surface), an initial background reference value must first be determined. The average brightness of ¼ inch (approximately 15–20 scanner rows or columns) margin will be acquired for each of the four sides of the scanner surface. If all four of these average values are within a given background delta value (e.g., approximately 20), then there is no photograph covering the edge of the scanner surface. Otherwise, a brightness value is selected from a majority of the four values and used as the initial background reference value.

FIG. 6B visually illustrates the processing of digital image 440 in accordance with the invention for determining the list 310 of contrast points 300. Digital image 440 is a digital representation of the output of scanner 62 corresponding to the configuration illustrated in FIG. 6A, whereby digital photograph 450 corresponds to original photograph 434 placed on the surface 430 of scanner 62.

In order to identify a comprehensive set of contrast points for locating the sides of digital photograph 450, four passes (452, 454, 456, 458) are performed over digital image 440 in the four visual directions of left to right (452), right to left (454), top to bottom (456), and bottom to top (458). Starting with the first row 444, last row 448, first column 442, or last column 446 (depending on the direction of traversal), each pixel in the respective column or row is checked with its previously traversed neighbor until a contrast point is identified or an end of the respective row or column is reached. If a side of the photograph 434 coincides or extends beyond an edge of the scanner surface 430, then the initial background reference value previously calculated is compared with the first pixel checked in each row or column to determine whether or not this first pixel is a contrast point. This process is iterated for each row and column in the digital image 440.

First, Pass No. 1 (452) is performed traversing digital image 440 from left to right. As indicated by the dashed arrows 53, each row of the digital image 440 is successively traversed, beginning in column 1 (442). Once a contrast point is recognized or the last column 446 is encountered, processing continues with the next row until row n (448) is traversed. Passes Nos. 2 (454), 3 (456) and 4 (458) are performed in a similar manner to that of Pass No. 1.

Figure 4A:
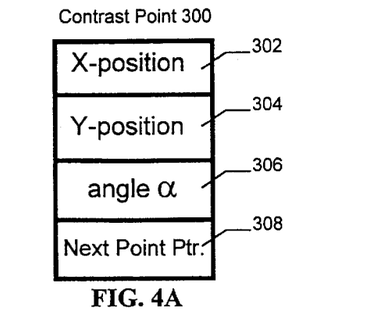
FIG. 4A is a schematic diagram of the data structure for a contrast point.
Figure 4B:
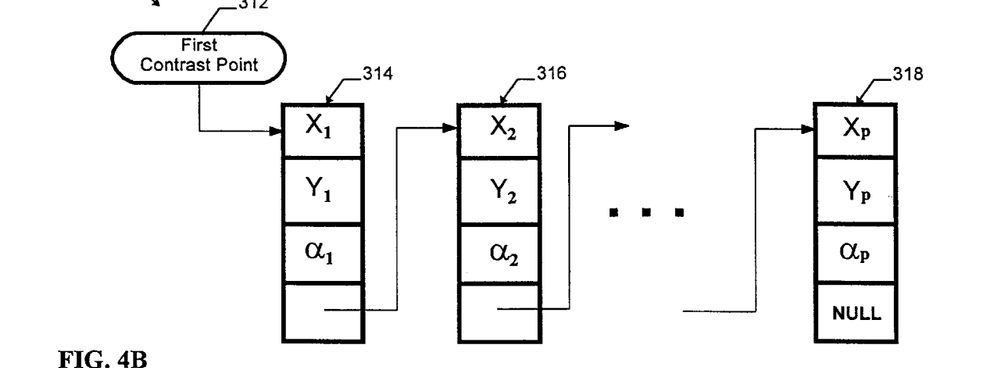
FIG. 4B is a schematic diagram of the data structure for the list of contrast points linking together multiple contrast point data structures depicted in FIG. 4A.

During this processing, each contrast point is added to the list 310 of contrast point data structures 300 as shown in FIGS. 4A–B. A contrast point data structure 300 contains four elements: an x-position 302 and a y-position 304 which represent the contrast point's position in the digital image; an angle α (described infra); and a Next Point Pointer 308 for linking to a next contrast point data structure 300 or containing NULL if it is the last element in the list 310. The list of contrast points is stored in a standard linked list as represented in FIG. 4B. A First Contrast Point variable 312 points to the first contrast point 314 in the list 310. Contrast Point 314 points to a next contrast point 316 in the list 310; and so forth until a last contrast point p (318) is reached. The Next Point Pointer 308 of contrast point p (318) contains NULL indicating that there are no more contrast points in the list 310.

FIG. 6C graphically represents an illustrative set 460 of contrast points 464 which could determined in accordance with the invention in step 205 of FIG. 3 for the digital image 440 shown in FIG. 6B. A dashed rectangle 462 is also shown for easy reference to the placement of digital photograph 450 within digital image 440. As depicted, not all of the contrast points correspond to the sides of digital photograph 450 (i.e., those contrast points 464 not residing on reference rectangle 462); rather these points are attributed to the noise induced into digital image 440 during the scanning process.

Once the list 310 of contrast points 464 has been determined, the list 310 is ordered list such that adjacent pixels in the list would correspond to adjacent positions on the perimeter of the photograph or objects if all contrast points where on the perimeter of digital photograph 450. To create this ordered list, steps 210, 215, 220, and 225 of FIG. 3 are performed. The operation of these steps is explained with reference to the illustration of FIG. 6D.

In step 210, a central reference point 466 is determined with its x-position and y-position are calculated from the respective average of the x-position 302 and y-position 304 elements of the contrast point data structures 300 stored in list 310. Using the central reference point 466 as the origin, a reference coordinate system 68 is determined for calculating a radial angle α for each of the contrast points 464 stored in the list 310 of contrast points data structures 300 per step 215. For example, contrast point 470 will have a radial angle $\alpha_a$ 472, and contrast point 474 will have a radial angle $\alpha_b$ 476.

The value of the radial angle α for any given contrast point 464 can be readily determined using simple mathematical principles. Assigning a coordinate position of $(X_0, Y_0)$ to the central reference point 466, the value of the radial angle α for a given contrast point 464 having a coordinate position of $(X_1, Y_1)$ is thus given by $\tan^{-1}[(Y_1-Y_0)/(X_1-X_0)]$. Step 220 is completed once the radial angle α has been determined for each contrast point in list 310, with this value being stored in the respective angle α 306 position of data structure 300. Finally, in step 225, the list 310 of contrast points is sorted by the angle α 306 element of each contrast point data structure 300, while removing duplicate entries for the same contrast point. Thus, if every contrast point represented in the ordered list 310 of contrast points was on the perimeter of the digital photograph, then traversing list 310 in order would correspond to traversing the path of the perimeter of digital photograph 450.

Returning to FIG. 3, next, step 230 is executed by processing unit 21 to translate the ordered set of contrast points into a list 340 of lines. Referring to mathematical principles, a standard equation for a line is $y=kx+b$, where k represents the slope of the line and b equals the offset from the origin. Thus, a line can be determined given its k and b values, and two lines that are the same will have the same k and b values.

In accordance with the invention, each derived line is added to the list 340 of line data structures 330 as shown in FIGS. 5A–B. A line data structure 330 contains four elements: k (332), b (334), a line count 336, and a Next Line Pointer 338 for linking to a next line data structure 330. The last element 338 in the list 340 contains NULL. The list of lines is stored as represented in FIG. 5B. A First Line variable 342 points to the first line data structure 330 in the list 340. Line 344 points to a next line 346 in the list 340; and so forth until a last line l (348) is reached. The Next Line Pointer 338 of line l data structure (318) contains NULL indicating that there are no more lines in the list 340.

In performing step 230 to derive the list 340 of lines, every contrast point in the list 310 is used to derive two lines. For each new line determined, a new line data structure 330 is created and added to the list 340 of lines. The sub-elements k (332) and b (334) of the newly created element 330 are set to the represented lines values; and its line count 336 is set to one. If the line already exists in the list 340, then the line count element 336 for the respective line data structure 330 is incremented by one. The list 340 of line data structures 330 is determined as described hereinafter.

To create the line list 340, every contrast point in the list 310 of contrast points is selected and used to form a line which runs through the selected contrast point and a contrast point represented by the contrast point data structure 300 being q positions in the list forward. If the end of the list 310 is reached, the processing wraps around to the beginning of the list 310 in determining the qth position forward in the list 310. Applicant has empirically determined that letting q equal twenty provides fast and efficient performance of the method and apparatus embodying the invention. For example, if the are 40 contrast points in ordered list 310, labeled for illustration purposes P1 to P40, 40 lines would be created. These lines corresponding to the lines running through points P1–P10, P2–12, . . . P30–P40, P30–P1, P32–P2, . . . P40–P10.

Once again, duplicate lines are stored within list 340 by increasing the line count element 336 for the corresponding line. However, because a digital image is comprised of discrete pixel elements, two lines created from a scanned in straight side might not have an identical value for its slope (k). Therefore, two lines are considered to be the same if the k and p values for two lines is within some small delta $\Delta$ of each other. Applicant has empirically determined that if $|\Delta| \leq 0.05$ then the lines are considered to have the same k value. For each line considered the same, the line count value 336 is incremented by one.

After establishing the list of lines 340, the sides of the rectangular bounding box are determined. In step 235 of the flow diagram of FIG. 3, the four lines generated most frequently in step 230 (i.e., the four lines having the largest line count value 336) are compared to the other lines in list 340, and their respective slopes and positions are adjusted slightly so that additional contrast points lie on them.

Next in step 240, the four lines having been the largest number of contrast points lying on them (i.e., the four line data structure elements 330 having the largest values for their line count sub-element 336) are compared to see if they roughly form a rectangle. If these four lines intersect to form a rectangular shape, the four sides of the rectangular bounding box 480 have been determined; each side coinciding with one of these four lines. If necessary, the sides of the rectangular bounding box 480 are adjusted slightly to form a rectangle in step 245.

However, if a rectangular shape is not formed, a base side of the rectangular bounding box 480 is determined from the line with the largest line count value 336. The other sides are determined based on their position with respect to the base side (i.e., either perpendicular or parallel to the base side). In determining the position of these other three sides, the line list 340 is referenced in an attempt to derive sides that are coincidental or close to the sides of the digital photograph 450.

Once a tentative rectangular bounding box 480 has been determined, step 250 is executed by processing unit 21 whereby the percentage of the points in the list of contrast points 310 whose positions lie on or within the rectangular bounding box 480 is determined. If the resultant percentage is greater than a predetermined threshold value, the rectangular bounding box 480 has been determined. If not, then until such a threshold value is exceeded, the sides of the rectangular bounding box 480 are be shifted in step 255 to include more contrast points. Applicant has empirically determined that a threshold value of 80 percent provides sufficient performance of the invention in a typical scanning environment, but consider that this value could be varied depending on the conditions of the scanning environment.

At this point in the processing, the rectangular bounding box 480 has been determined in accordance with the invention. The size and position of the rectangular bounding box 480 for the illustrative example described herein is shown in FIG. 6E.

Processing then returns to the high-level flow diagram shown in FIG. 2. In step 115, processing unit 21 directs scanner 62 to perform a high resolution scan on the area on its surface 430 roughly proportional to the size and position of the rectangular bounding box 480 to acquire a detailed scan of the photograph 434. Finally, in step 120, the rectangular bounding box 480 is used to extract the pixels generated in step 115 corresponding to the original photograph 434.

Having described and illustrated the principles of the invention with reference to an illustrated embodiment, it will be recognized that the illustrated embodiment can be modified in arrangement and detail without departing from such principles. For example, using two passes instead of four to determine the set of contrast points, using arrays of contrast points and lines in place of linked lists, and varying the method of determining the set of lines. Also, the invention may be executed in an application program 36, other program modules 37, scanner interface 60 or device driver, or even in a scanner 62; and the digital image processed may be generated by a scanner 62 or numerous other input devices, or be the output of some process.

In view of the many possible embodiments to which the principles of our invention may be applied, it should be recognized that the embodiment described herein with respect to the drawing figures is only illustrative and should not be taken as limiting the scope of the invention. To the contrary, the invention as described herein contemplates all such embodiments as may come within the scope of the following claims and equivalents thereof.

I claim:

1. In a computer system, a method for automatically determining a rectangular bounding box of an object represented in a digital image without user interaction, the rectangular bounding box having a base side and three other sides, the digital image having a contrast point, the method comprising the steps of:

processing the digital image to determine a set of the contrast points for locating pixels corresponding to a perimeter of the object;

deriving a set of lines from the set of the contrast points for locating the base side and the three other sides of the rectangular bounding box;

determining a position and a slope of the base side corresponding to a first line from the set of lines, a largest number of the contrast points from the set of the contrast points being located on the first line; and determining the three other sides of the rectangular bounding box based on the position and the slope of the first line.

2. The method of claim 1, wherein the three other sides of the rectangular bounding box correspond with a second, third and fourth lines from the set of lines, wherein the first, second, third and fourth lines having as many contrast points located on them as any other line in the set of lines.

3. The method of claim 1, wherein the object comprises a photograph.

4. The method of claim 1, wherein the digital image is acquired from one of a plurality of possible devices, and the steps of claim 1 are device independent.

5. The method of claim 1, further comprising the step of:

adjusting the sides of the rectangular bounding box so that a minimum percentage of the points in the set of contrast points are contained within the rectangular bounding box.

6. The method of claim 5, wherein the minimum percentage is eighty percent.

7. The method of claim 1 further comprising the step of scanning the object to create the digital image, wherein the digital image contains noise.

8. The method of claim 7, wherein the object is rectangular in shape, and the orientation of the object is skewed in comparison to one or more sides of a scanning surface, whereby an area corresponding to the rectangular bounding box is extracted from the digital image to produce a second, non-skewed digital image.

9. The method of claim 1, wherein the digital image comprises a matrix, and the step of processing the digital image to determine the set of the contrast points comprises sequencing through the digital image starting at (1) the first pixel in the matrix of pixels for (i) each column and (ii) each row, and (2) the last pixel in the matrix of pixels for (i) each column and (ii) each row, and traversing the respective column or row until locating the contrast point or an end of the matrix.

10. The method of claim 1, wherein the step of deriving the set of lines, comprises the steps of:

removing duplicate contrast points from the list of the contrast points;

calculating a central reference point based on the set of the contrast points;

determining a radial angle for each of the contrast points based on its location with respect to a reference coordinate system whose origin is the central reference point;

ordering the list of contrast points by the radial angle of each of the contrast points;

deriving a new line for an every two points separated by a separation number of elements; and adding the new line to the set of lines.

11. The method of claim 10, wherein the separation number is 10.

12. In a computer system, a method for automatically determining a rectangular bounding box of an object represented in a digital image without user interaction, the rectangular bounding box having a base side and three other sides, the digital image having a contrast point, the method comprising the steps of:

(a) processing the digital image to determine a set of the contrast points for locating pixels corresponding to a perimeter of the object;

(b) deriving a set of lines from the set of the contrast points for locating the base side and the three other sides of the rectangular bounding box, including the steps of:

(i) removing duplicate contrast points from the list of the contrast points, (ii) calculating a central reference point based on the set of the contrast points, (iii) determining a radial angle for each of the contrast points based on its location with respect to a reference coordinate system whose origin is the central reference point, (iv) ordering the list of contrast points by the radial angle of each of the contrast points, (v) deriving a new line for an every two points separated by a separation number of elements, and (vi) adding the new line to the set of lines;

(c) determining a position and a slope of the base side corresponding to a first line from the set of lines, a largest number of the contrast points from the set of the contrast points being located on the first line;

(d) determining the three other sides of the rectangular bounding box based on the position and the slope of the first line; and (e) adjusting the sides of the rectangular bounding box so that a minimum percentage of the points in the set of contrast points are contained within the rectangular bounding box.

13. The method of claim 12, wherein the digital image comprises a matrix, and the step of processing the digital image to determine the set of the contrast points comprises sequencing through the digital image starting at (1) the first pixel in the matrix of pixels for (i) each column and (ii) each row, and (2) the last pixel in the matrix of pixels for (i) each column and (ii) each row, and traversing the respective column or row until locating the contrast point or an end of the matrix.

14. The method of claim 13 further comprising a scanner, and the method of claim 11 further comprising the step of scanning the object to create the digital image, wherein the digital image contains noise.

15. The method of claim 14, wherein the three other sides of the rectangular bounding box correspond with a second, third and fourth lines from the set of lines, wherein the first, second, third and fourth lines having as many contrast points located on them as any other line in the set of lines.

16. The method of claim 15, wherein the object comprises a rectangular photograph, and the orientation of the rectangular photograph is skewed in comparison to one or more sides of a scanning surface, whereby an area corresponding to the rectangular bounding box is extracted from the digital image to produce a second, non-skewed digital image.

17. A computer-readable medium having computer-executable instructions for performing steps, comprising:

processing a digital image to determine a set of contrast points for locating pixels corresponding to a perimeter of an object represented in the digital image;

deriving a set of lines from the set of contrast points for locating a base side and three other sides of a rectangular bounding box;

determining a position and a slope of the base side corresponding to a first line from the set of lines, a largest number of the contrast points from the set of contrast points being located on the first line; and determining the three other sides of the rectangular bounding box based on the position and the slope of the first line.

18. The computer-readable medium of claim 17, wherein the three other sides of the rectangular bounding box correspond with a second, third and fourth lines from the set of lines, wherein the first, second, third and fourth lines having as many contrast points located on them as any other line in the set of lines.

19. The computer-readable medium of claim 17 having further the computer-executable step of controlling a scanner to create the digital image.

20. The computer-readable medium of claim 17 having further the computer-executable step of extracting an area corresponding to the rectangular bounding box from the digital image to produce a second digital image.

21. In a computer system, a method for automatically determining a rectangular bounding box of an object represented in a digital image without user interaction, the rectangular bounding box having a base side and three other sides, the digital image having a contrast point, the method comprising the steps of:

processing the digital image to determine a set of the contrast points for locating pixels corresponding to a perimeter of the object;

deriving a set of lines from the set of the contrast points for locating the base side and the three other sides of the rectangular bounding box, whereby each line is associated with a weight; and determining the positions and slopes of the base side and the three other sides of the rectangular bounding box based on four lines from the set of lines which have the greatest weights associated with them.

22. The method according to claim 21, wherein the step of deriving a set of lines from the set of the contrast points comprises the steps of:

removing duplicate contrast points from the list of the contrast points;

calculating a central reference point based on the set of the contrast points;

determining a radial angle for each of the contrast points based on its location with respect to a reference coordinate system whose origin is the central reference point;

ordering the list of contrast points by the radial angle of each of the contrast points;

deriving a new line for every two points separated by a separation number of elements;

adding the new line to the set of lines; and associating with each line in the set of lines a weight corresponding to the number of lines in the set of lines having substantially the same slope.

* * * * *

UNITED STATES PATENT AND TRADEMARK OFFICE
CERTIFICATE OF CORRECTION

PATENT NO.    : 6,049,636                                              Page 1 of 1
DATED         : April 11, 2000
INVENTOR(S)   : Xiaoli Yang It is certified that error appears in the above-identified patent and that said Letters Patent is hereby corrected as shown below:

<u>Title page,</u>
Item [56], U.S. PATENT DOCUMENTS, the following references should be added:
-- 5,243,665    9/93    Maney et al.
   5,428,718    6/95    Peterson et al. --

<u>Column 8,</u>
Line 52, "[($^Y$1-Y0)/(X1-X0)]" should read -- [(Y1-Y0)/(X1-X0)] --.

Signed and Sealed this

Eleventh Day of November, 2003

JAMES E. ROGAN
*Director of the United States Patent and Trademark Office*